PULSE INTEGRATOR QUANTIZER WITH SINGLE RESET

Filed June 8, 1959

INVENTORS.
HARRY C. KUNTZLEMAN
JOHN G. SIMEK
BY
AGENT

United States Patent Office 2,951,949

Patented Sept. 6, 1960

2,951,949

PULSE INTEGRATOR QUANTIZER WITH SINGLE RESET

Harry C. Kuntzleman, Newark Valley, and John G. Simek, Endwell, N.Y., assignors to International Business Machines Corporation, New York, N.Y., a corporation of New York Filed June 8, 1959, Ser. No. 818,836

6 Claims. (Cl. 307—88)

This invention relates generally to switching systems and pertains more particularly to a system for producing quantized pulses.

The present invention finds particular usefulness in connection with the reduction in quantity and amplitude of oscillation which generally results with the opening and closing of an electromechanical circuit due to contact bounce. For the practical use of many electrical and electronic circuits, it is desirable to have a source of accurately quantized pulses. Quantized pulses are herein defined as pulses which are constant with respect to the integral of the volt/time area under their wave forms. For example, voltage pulses can be considered constant when the volt/second integral of each pulse has the same relationship with the volt/second integrals of other pulses.

Heretofore, pulses of this type have been produced by various means, such as, electronic tube circuitry, more sophisticated mechanical arrangements for opening and closing electrical contacts, and the employment of filtering means to eliminate the unwanted oscillations, etc. Such arrangements have never been completely satisfactory.

A principal object of this invention is to provide apparatus for the generation of accurately quantized pulses by employing a magnetizable element that can be alternately driven to saturation in opposite directions so as to produce constant and integrated output signals.

Another object of the invention is to provide for controlling the saturation of a magnetic core element in one direction in response to input pulses and then between input pulses to reset the magnetic core element to saturation in the opposite direction.

Another object of the invention is to provide transistorized reset control means for a magnetizable element.

A further object of the invention is the provision of a circuit capable of producing quantized pulses suitable for counting purposes.

Still another object of the invention is to provide a simple circuit in which the reset of the quantizer can readily be delayed by changing the time constant.

A further object of the invention is to provide an all-solid state circuit formed of simple elements, readily manufactured and readily assembled to produce a durable, efficient construction at minimum cost.

Briefly, in a pulse integrator quantizer circuit with single reset constructed in accordance with the invention, an input pulse switches a magnetic core by driving the input winding so that the core goes to saturation in a given sense so as to produce a quantized pulse on an output winding of the core and at the same time fires a first transistor so that a capacitor will be charged. This charge turns off a second transistor for a predetermined time dependent upon a time constant of an RC time delay arrangement. This prevents more than one quantized pulse on the output winding for each input pulse. When the input pulse disappears, the capacitor discharges through a resistor and subsequently allows the second transistor to restore to its normally conductive state, thereby resetting the core to its normal condition through the reset winding.

The foregoing and other objects, features and advantages of the invention will be apparent from the following more particular description of a preferred embodiment of the invention, as illustrated in the accompanying drawings.

Figure 1:
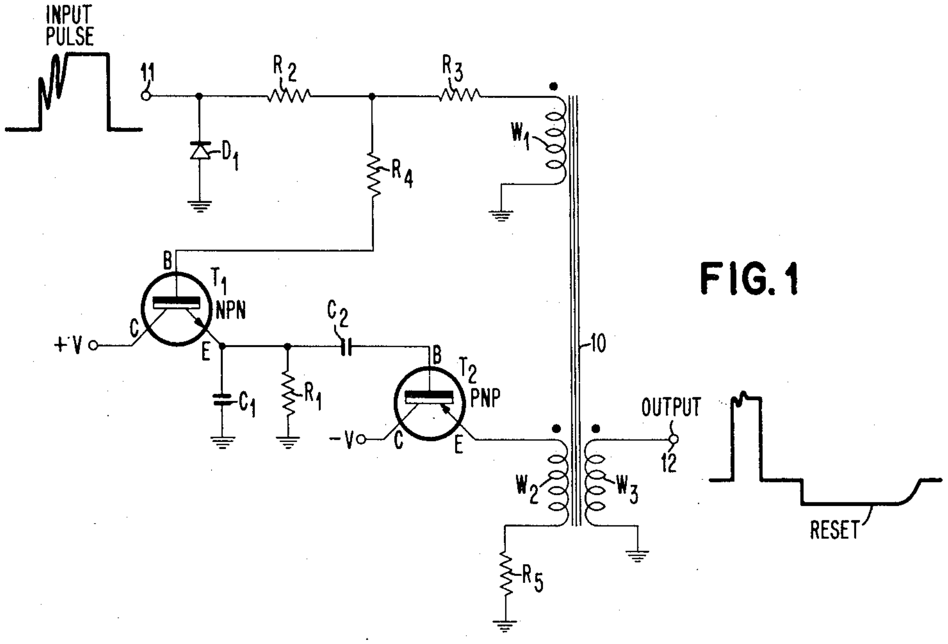
Fig. 1 is a circuit diagram of a transistor controlled magnetic core quantizer in accordance with the present invention.

Referring now to Fig. 1 for an understanding of the basic principles of the invention, it will presently be seen that the circuit shown provides a facile and inexpensive way of producing quantized pulses. The circuit includes a magnetizable core element 10 having inductively associated therewith an input coil or winding W1, an output coil or winding W3, and a reset coil or winding W2. The material for the core 10 should preferably be of those magnetic materials having essentially rectangular hysteresis loop and relatively low coercive force characteristics.

The output winding W3 is connected with an output terminal 12. The input winding W1 is connected through the serially connected resistors R3 and R2 to an input terminal 11. If a unidirectional voltage pulse of sufficient magnitude to overcome the coercive force of the magnetizable core 10 is applied to the input terminal 11, then the current that flows in the winding W1 will cause the core 10 to become magnetically saturated in a corresponding direction. Since the coils W1 and W3 are inductively associataed with the magetizable element 10, a current will flow through the output coil W3 whenever there is a change of flux in the core 10. A change in flux occurs only if a magnetizing force of sufficient magnitude to overcome the coercive force of the magnetic material 10 is applied in a direction in which the material is not saturated. Thus once the core material has been saturated in a given direction, the further application of a magnetizing force in that direction will produce no further flux changes and no current will be produced in the output coil W3. In the preferred embodiment, a diode D1 is connected between the input terminal 11 and ground. This diode serves to prevent unidirectional pulses of the opposite polarity from being effective in energizing the input winding W1.

Figure 2:
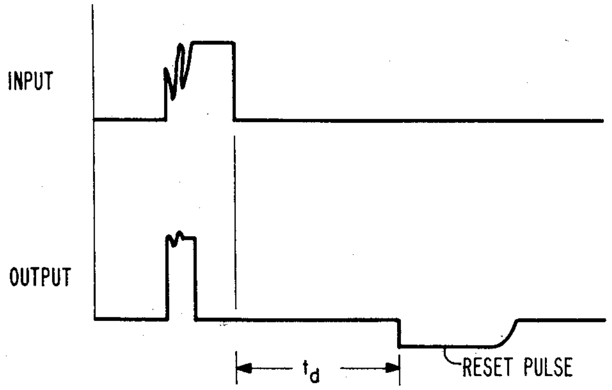
Fig. 2 is a diagram showing the wave forms for the input and output pulses of the circuit of Fig. 1.

A transistorized reset control circuit comprises the normally nonconductive transistor T1 and the normally conductive transistor T2. The base element of the transistor T1 is coupled through the resistor R4 to an electrical tap between the resistors R2 and R3. The application of an effective unidirectional input pulse to the input terminal 11 places a positive voltage on the base of the transistor T1, causing it to conduct and thereby causing the capacitor C1 that is coupled to the emitter element of the transistor T1 to become charged positively. The emitter element of the transistor T1 is capacitively coupled by means of the capacitor C2 to the base element of the transistor T2. When the transistor T1 is conductive, the transistor T2 is rendered nonconductive. When the input pulse applied to the input terminal 11 disappears, the transistor T1 will become nonconductive. The transistor T2 will remain nonconductive for a predetermined period of time dependent upon the time constant of the time delay arrangement comprising the capacitor C1 and the resistor R1. As the charge on capacitor C1 is dissipated in the resistor R1, the transistor T2 will be restored to its conductive state. The emitter element of the transistor T2 is connected with the reset winding W2. When the transistor T2 conducts, the current flow through the transistor T2, the reset winding W2, and the resistor R5 will produce a magnetizing force of sufficient magnitude to overcome the coercive force of the magnetic material of core 10. The change in flux produced when the magnetic material of core 10 is changed from magnetic saturation in one direction to magnetic saturation in the other direction will produce a current flow in the output winding W3, causing a reset pulse to occur at the output terminal 12. The output wave forms are as shown in the diagram of Fig. 2. The delay time $t_d$ for controlling the reset time can be readily changed by altering the values of either C1 and/or R1.

It should be noted that as soon as the effective unidirectional input pulse switches the core 10, the oscillations in the input pulse due to the operation of the input pulse source will not effect the flux condition of the core 10 since the delay time of the time delay circuit comprising the capacitor C1 and the resistor R1 is such that the capacitor C1 cannot discharge fast enough to reset the core through the transisitor T2. Consequently, as the capacitor C1 starts to discharge, the next upward traveling oscillation occurs, recharging the capacitor C1 with any of the charge it might have lost during the downward excursion of the input pulse. After the input pulse disappears, the capacitor C1 will discharge and after a predetermined period of time causes a resetting operation to occur, thereby placing the circuit in readiness for the next input pulse.

In summarization, it should be noted that the structural arrangement of the circuitry as herein disclosed serves to produce accurately quantized pulses independent of wave form oscillation and without adverse effects due to the aging of the components making up the system. The system possesses advantages of adjustability, a high degree of stability, and other features which make it attractive wherever a precision quantized voltage pulse is desired.

While the invention has been particularly shown and described with reference to a preferred embodiment thereof, it will be understood by those skilled in the art that various changes in form and details may be made therein without departing from the spirit and scope of the invention.

What is claimed is:

1. In a pulse quantizing circuit, the combination comprising a saturable magnetic core having relatively low coercive force characteristics; an input coil, an output coil, and a reset coil inductively associated with said core, said output coil being adapted for connection with quantized pulse utilization means, said input coil being connected with an input circuit comprising a pair of serially coupled resistors adapted for connection with a source of unidirectional pulse signals of sufficient magnitude to saturate said core in a given direction so as to produce a quantized output pulse in said output coil; reset control means comprising a normally nonconductive first transistor coupled to said input circuit and responsive to a unidirectional input pulse to render said first transistor conductive; a normally conductive second transistor coupled to said first transistor, said second transistor being made nonconductive when said first transistor is conducting, a time delay circuit, said time delay circuit serving to maintain said second transistor nonconductive for a predetermined period after the termination of the input pulse; and means connecting said second transistor to said reset winding so as to switch said magnetic core to its opposite direction of saturation when said second transistor is restored to its normally conductive state and thereby produce a reset pulse in said output winding.

2. In a pulse quantizing circuit, the combination comprising a saturable magnetic core having relatively low coercive force characteristics; an input coil, an output coil, and a reset coil inductively associated with said core, said output coil being adapted for connection with quantized pulse utilization means, said input coil being connected with an input circuit comprising a pair of serially coupled resistors adapted for connection with a source of unidirectional pulse signals of sufficient magnitude to saturate said core in a given direction so as to produce a quantized output pulse in said output coil; reset control means comprising a normally nonconductive first transistor coupled to an electrical tap between said pair of resistors in said input circuit and responsive to a unidirectional input pulse to render said first transistor conductive; a normally conductive second transistor coupled to said first transistor, said second transistor being made nonconductive when said first transistor is conducting, a time delay circuit including a resistor and a capacitor in parallel arrangement connected between said first transistor and ground, said capacitor in the time delay circuit being charged when said first transistor is conducting and serving to maintain said second transistor nonconductive for a predetermined period after the termination of the input pulse; and means connecting said second transistor to said reset winding so as to switch said magnetic core to its opposite direction of saturation when said second transistor is restored to its normally conductive state and thereby produce a reset pulse in said output winding.

3. In a pulse quantizing circuit, the combination comprising a saturable magnetic core having relatively low coercive force characteristics; an input coil, an output coil, and a reset coil inductively associated with said core, said output coil being adapted for connection with quantized pulse utilization means, said input coil being connected with an input circuit comprising a pair of serially coupled resistors adapted for connection with a source of unidirectional input pulse signals of sufficient magnitude to saturate said core in a given direction so as to produce a quantized output pulse in said output coil; transistorized reset control means comprising a normally nonconductive first transistor having a base thereof coupled through a resistor to an electrical tap between said pair of resistors in said input circuit and responsive to a unidirectional input pulse to render said first transistor conductive; a normally conductive second transistor having a base capacitively coupled to an emitter of said first transistor, said second transistor being made nonconductive when said first transistor is conducting; a time delay circuit including a resistor and a capacitor in parallel arrangement connected between the emitter of said first transistor and ground, said capacitor in the time delay circuit being charged when said first transistor is conducting and serving to maintain said second transistor nonconductive for a predetermined period after the termination of the input pulse; and means connecting the emitter of said second transistor to said reset coil so as to switch said magnetic core to its opposite direction of saturation when said second transistor is restored to its normally conductive state and thereby produce a reset pulse in said output coil.

4. In a pulse integrator quantizing circuit, the combination comprising a saturable magnetic core having an input winding, an output winding, and a reset winding in inductive relationship therewith; an input circuit including a pair of serially coupled resistors connecting said input winding to an input pulse source and responsive to a unidirectional input pulse to switch the flux condition of said magnetic core to thereby provide an integrated quantized output pulse in said output winding, reset control means comprising a normally nonconductive first transistor with the base thereof coupled through a resistor to an electrical tap between said pair of said resistors in said input circuit and responsive to a unidirectional input pulse to render said first transistor conductive, a normally conductive second transistor means capacitively coupling said first transistor to said second transistor and rendering said second transistor nonconductive when said first transistor is made conductive, a time delay circuit, said time delay circuit serving to maintain said second transistor nonconductive for a predetermined period of time after the termination of the input pulse, and means connecting said second transistor to said reset winding so as to switch the state of magnetic flux of said magnetic core to its opposite direction of saturation when said second transistor is restored to its normally conductive state and thereby produce a reset pulse in said output winding.

5. In a pulse integrator quantizing circuit, the combination comprising a saturable magnetic core having an input winding, an output winding, and a reset winding in inductive relationship therewith; an input terminal; an output terminal; means connecting said output terminal with said output winding; an input circuit including a pair of serially coupled resistors connecting said input terminal with said input winding and responsive to an input pulse applied thereto to switch the flux condition of said magnetic core in a given sense to thereby provide an integrated quantized output pulse at said output terminal; transistorized reset control means comprising a normally nonconductive first transistor having a base, emitter, and collector with the base thereof coupled through a resistor to an electrical tap between said pair of said resistors in said input circuit and responsive to an input pulse to render said first transistor conductive; a normally conductive second transistor having a base, emitter, and collector; means capacitively coupling the emitter of said first transistor to the base of said second transistor for rendering said second transistor nonconductive when said first transistor is made conductive; a time delay circuit including a resistor and a capacitor in parallel connected between the emitter of said first transistor and ground, said capacitor in the time delay circuit being charged when said first transistor is conducting and serving to maintain said second transistor nonconductive for a predetermined period of time after the termination of the input pulse; and means connecting the emitter of said second transistor to said reset winding so as to switch the state of magnetic flux of said magnetic core to its opposite sense when said second transistor is restored to its normally conductive state and thereby produce a reset pulse at said output terminal.

6. A pulse integrator quantizing circuit as in claim 5 characterized by rectifying means connected with said input terminal for permitting said input circuit to be responsive to unidirectional pulses only.

No references cited.